United States Patent [19]

Yamamoto

[11] Patent Number: 4,745,825
[45] Date of Patent: May 24, 1988

[54] TRANSFER SYSTEM TO SELECTIVELY PERFORM THE TWO-WHEELED AND FOUR-WHEELED DRIVING OPERATIONS FOR USE IN AUTOMOBILES

[75] Inventor: Tamotsu Yamamoto, Toyohashi, Japan

[73] Assignee: Fuji Tekko Co., Ltd., Kosai, Japan

[21] Appl. No.: 43,455

[22] Filed: Apr. 28, 1987

[30] Foreign Application Priority Data

Nov. 20, 1986 [JP] Japan ................... 61-277505

[51] Int. Cl.$^4$ .......................................... F16H 37/06
[52] U.S. Cl. ..................... 74/665 GA; 74/665 GE; 180/247; 180/251
[58] Field of Search ................ 74/665 GA, 665 GE; 180/233, 247, 251

[56] References Cited

U.S. PATENT DOCUMENTS

| 2,399,201 | 4/1946 | Buckendale et al. | 180/233 X |
| 4,270,409 | 6/1981 | Glaze et al. | 180/247 X |
| 4,292,860 | 10/1981 | Kako et al. | 74/665 GA |

FOREIGN PATENT DOCUMENTS

| 0057431 | 3/1986 | Japan | 180/233 |
| 2171967 | 9/1986 | United Kingdom | 180/233 |

*Primary Examiner*—Dirk Wright
*Attorney, Agent, or Firm*—Wenderoth, Lind & Ponack

[57] ABSTRACT

A transfer gear has high speed and low speed modes with two wheel drive or four wheel drive. A main drive shaft has a main drive gear rotatably mounted on it. A main shaft is coaxial with the main drive shaft and carries a speed change gear rotatably on it and drives the rear wheels. The main shaft further rotatably supports a front drive gear which transfers power to the front wheels. A counter gear assembly provides a speed reduction between the main drive gear and the speed change gear. A first switching mechanism connects the main drive shaft to either the main shaft or the main drive gear. A second switching mechanism connects the main shaft either to the speed change gear or to the front drive gear, or disconnects both the speed change gear and the front drive gear from the main shaft, or connects both the speed change gear and the front drive gear to the main shaft.

8 Claims, 3 Drawing Sheets 4,745,825

TRANSFER SYSTEM TO SELECTIVELY PERFORM THE TWO-WHEELED AND FOUR-WHEELED DRIVING OPERATIONS FOR USE IN AUTOMOBILES

BACKGROUND OF THE INVENTION

The present invention relates to a transfer system for an automobile having a sub speed change gear for selectively performing the high-speed and low-speed driving operations in the two-wheeled or four-wheeled driving mode and, more particularly, to a transfer system of this type adapted to prevent the racing of the speed reduction gear system including a counter gear when the sub speed change gear is set to the high-speed position.

Hitherto, as such a transfer system having a sub speed change gear to selectively perform the four-wheeled driving operation (hereinafter, referred to as a 4WD) and the two-wheeled driving operation (hereinafter, referred to as a 2WD), for example, a system as shown in FIG. 1 has been known.

In FIG. 1, reference numeral 10 denotes a transfer unit to selectively perform the 2WD and 4WD, and 12 indicates a sub speed change gear unit which receives the rotational motive power from a main speed change gear (not shown) and sets the operating mode to the high speed or low-speed operating mode. A main drive shaft 18 is rotatably attached in a casing 14 of the sub speed change gear 12 by a bearing 16. The rotational motive power from the main speed change gear is transferred to the main drive shaft 18. Subsequent to the main drive shaft 18, a main shaft 20 is coaxially and relatively rotatably attached in the casing 14 through a needle bearing 25. The main shaft 20 is rotatably supported to a casing partition wall 24 by a bearing 22. Further, the main shaft 20 penetrates inside of a casing 26 of the transfer unit 10 and is supported by a bearing 28 and thereafter, the main shaft 20 is taken out to the outside and extended to the side of a propeller shaft (the side of rear wheels).

A main drive gear 30 is fixed to the main drive shaft 18 of the sub speed change gear unit 12. A first counter gear 34 fixed to a counter shaft 32 is come into engagement with the main drive gear 30. A second counter gear 36 fixed to the counter shaft 32 is come into engagement with a speed change gear 40 relatively rotatably attached to the main shaft 20 through a needle bearing 38. The counter shaft 32 is rotatably supported by the casing 14 and partition wall 24 by bearings 45 and 55.

Therefore, the rotational motive power of the main drive shaft 18 is transferred through the main drive gear 30, counter gear 34, counter shaft 32, and counter gear 36 to the speed change gear 40, so that the speed is reduced.

A hub 42 having an outer peripheral spline is fixed to the position of the main shaft 20 between the main drive gear 30 and the speed change gear 40. A coupling sleeve 44 is come into engagement with the outer peripheral spline of the hub 42 so as to be slidable in the axial direction by the inner peripheral spline. Further, a clutch gear 46 is arranged on the left side of the hub 42. The clutch gear 46 is formed integrally with the main drive gear 30. A clutch gear 48 is arranged on the right side of the hub 42. The clutch gear 48 is formed integrally with the speed change gear 40.

The coupling sleeve 44 is moved in the axial direction by a shift fork (not shown) which is interconnected with the operation of a shift lever. When the shift lever is set to the high-speed position, the coupling sleeve 44 is come into engagement with the hub 42 and clutch gear 46 as shown in the diagram, thereby directly coupling the main drive shaft 18 with the main shaft 20. The rotational motive force from the main drive shaft 18 is directly transferred to the main shaft 20 without reducing the speed.

On the contrary, when the shift lever is set to the low-speed position, the coupling sleeve 44 is moved to the right and is come into engagement with the clutch gear 48 on the side of the speed change gear 40, thereby coupling the gear 40 with the main shaft 20. Thus, the rotational motive power from the main drive shaft 18 is transferred to the speed change gear 40 through the path consisting of the main drive gear 30, counter gear 34, counter shaft 32, and counter gear 36. Further, this power is transferred through the clutch gear 48, coupling sleeve 44, and hub 42 to the main shaft 20. Thus, the rotational motive power is reduced at the speed reduction ratios which are set by the engagement between the main drive gear 30 and the counter gear 34 and by the engagement between the counter gear 36 and the speed change gear 40. The speed reduced rotational motive power is transferred to the main shaft 20.

The transfer unit 10 will now be described. A hub 50 is fixed to the main shaft 20 which penetrates inside of the casing 26. A front driving sprocket gear 54 which is formed integrally with a clutch gear 52 is rotatably arranged on the left side of the hub 50 through a needle bearing 65. A coupling sleeve 58 is come into engagement with the outer peripheral spline of the hub 50 so as to be movable in the axial direction by the inner peripheral spline. The coupling sleeve 58 is moved in the axial direction in association with the motion of the shift lever which is set to the 2WD or 4WD position. When the shift lever is set to the 2WD position, the coupling sleeve 58 is moved to the right and disengages from the clutch gear 52, so that the sprocket gear 54 is disconnected from the main shaft 20. When the shift lever is set to the 4WD position, the coupling sleeve 52 is moved to the left and is come into engagement with the clutch gear 52 as shown in the diagram. Thus, the sprocket gear 54 is coupled with the main shaft 20 and is rotated integrally with the main shaft 20.

A front drive shaft 60 is rotatably supported by bearings 62 and 64 at the position which is away from the main shaft 20 by a predetermined distance. A sprocket gear 66 is fixed to the front drive shaft 60 and a chain 68 is wound between the sprocket gears 60 and 54.

Therefore, when the coupling sleeve 58 is come into engagement with the clutch gear 52 by setting the shift lever to the 4WD position, the rotational motive power of the main shaft 20 is transferred to the front drive shaft 60 through the hub 50, coupling sleeve 58, clutch gear 52, sprocket gear 54, chain 68, and sprocket gear 66. The front wheels are driven by the front drive shaft 60 and at the same time, the rear wheels are driven by the main shaft 20, so that the automobile enters the 4WD running state.

On the other hand, when the shift lever is set to the 2WD position, the coupling sleeve 58 disengages from the clutch gear 52 and the rotational motive power of the main shaft 20 is not transferred to the sprocket gear 54. Thus, only the rear wheels are driven by the main shaft 20. The automobile enters the 2WD running state.

However, in such a conventional transfer system, in the running state in which the sub speed change gear unit 12 is set to the high-speed position and the main drive shaft 18 is coupled with the main shaft 20, the main drive gear 30, counter gears 34 and 36, and speed change gear 40 which do not transfer the motive power race, so that there occurs such a problem that the engagement noises are generated by the racing of the gears.

On the other hand, there is also a problem such that the loss of motive power occurs in the driving system due to the unnecessary rotations of the main drive gear 30, counter gears 34 and 36, and speed change gear 40 at the high-speed position.

SUMMARY OF THE INVENTION

It is an object of the present invention to provide a transfer system for use in automobiles which can prevent the generation of the noises by the racing of the gears of the speed reduction gear system including the counter gears in the sub speed change gear unit.

Another object of the invention is to provide a transfer system for use in automobiles which can minimize the loss of motive power by the racing of the gears of the speed reduction gear system including the counter gears in the sub speed change gear unit.

Still another object of the invention is to provide a transfer system for use in automobiles which can selectively perform the 2WD and 4WD operations and the high-speed and low-speed driving operations by switching by a simple switching mechanism.

According to the present invention, there is provided a transfer system for use in aubomobiles in which the rotational motive power is input from the main speed change gear and the speed is changed into at least two levels of high and low speeds and at the same time, the 2WD and 4WD operations are selectively performed.

The rotational motive power from the main speed change gear is input to the main drive shaft. The main drive gear is rotatably supported to the main drive shaft. The rotational motive power of the main drive gear is transferred to the speed change gear rotatably attached to the main shaft through the counter gear mechanism.

Therefore, at the high-speed position, the main drive shaft is coupled with the main shaft by the first switching means. At this time, the main drive gear, counter gear system, and speed change gear are not rotated. At the low-speed position, the main drive shaft is coupled with the main drive gear by the first switching means and the rotation whose rotational speed was reduced by the counter gear system is transferred to the speed change gear.

The speed change gear rotatably supported to the main shaft is coupled with the main shaft or the main shaft and front drive gear by the second switching means.

Namely, in the 2WD high-speed operating mode, since the rotational motive power is coupled with the main shaft, the second switching means disconnects the speed change gear and front drive gear from the main shaft. In the 4WD high-speed operating mode, the second switching means couples the main shaft with the front drive gear, thereby driving the front and rear wheels. Further, in the 4WD low-speed operating mode, all of the speed change gear, main shaft, and front drive gear are coupled, so that the speed reduced rotation transferred to the speed change gear is transferred to the front and rear wheels.

On the other hand, in the 2WD low-speed operating mode, the second switching means couples the speed change gear with the main shaft, thereby transferring the speed reduced rotational motive power to only the rear wheels.

Therefore, in the 2WD and 4WD high-speed operating modes, the speed reduction gear system consisting of the main drive gear, counter gear system, and speed change gear does not rotate. The noises by the racing of the gears of the speed reduction gear system are not generated. In addition, the loss of motive power of the driving system due to the racing of the speed reduction gear system can be minimized.

The above and other objects, features, and advantages of the present invention will become more apparent from the following detailed description in conjunction with the accompanying drawings.

DETAILED DESCRIPTION OF PREFERRED EMBODIMENTS

Figure 1:
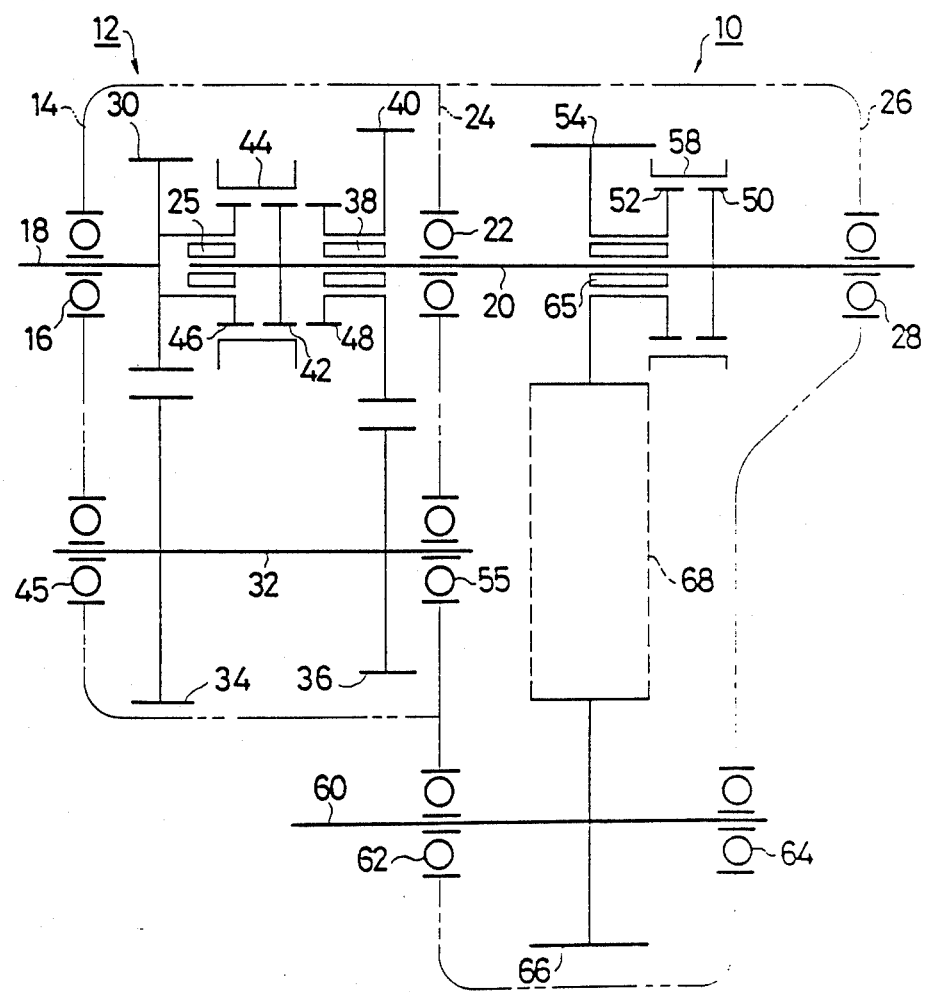
FIG. 1 is a diagram showing an arrangement of a gear train of a conventional example.
Figure 2:
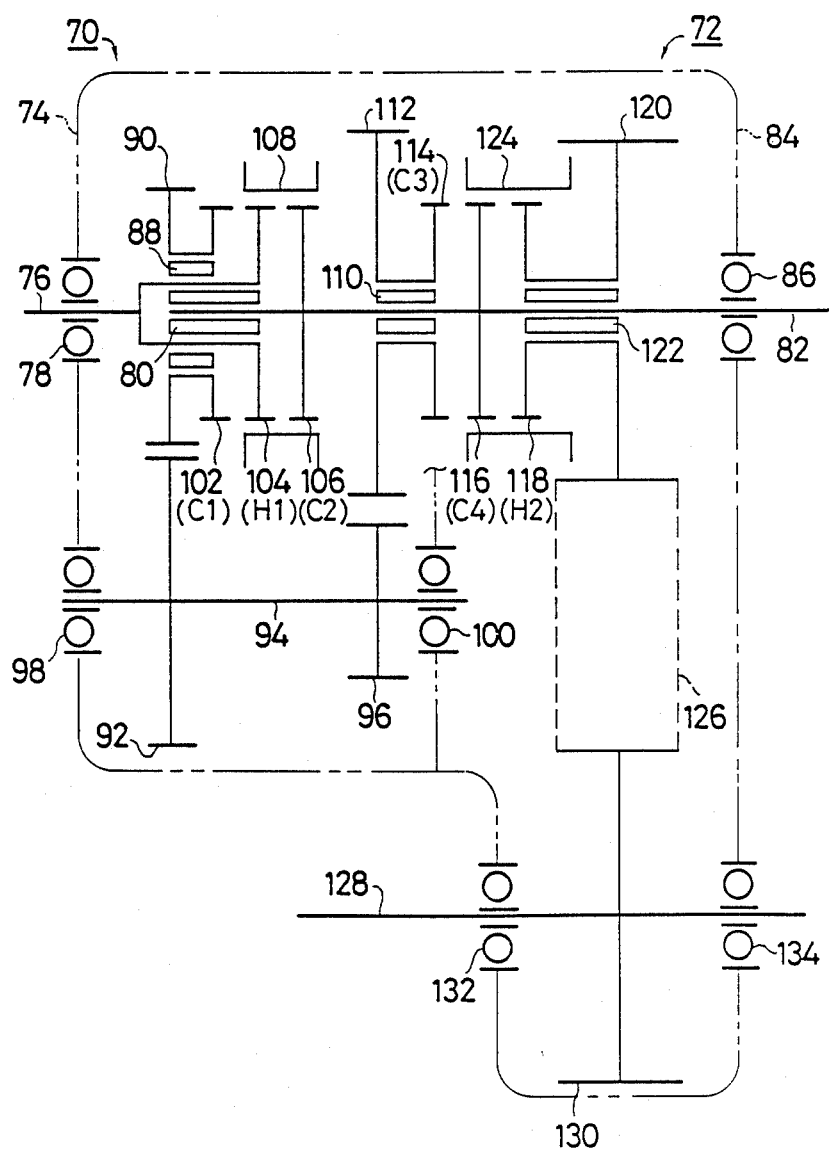
FIG. 2 is a diagram showing an arrangement of a gear train according to an embodiment of the present invention.

FIG. 2 is a diagram showing an arrangement of a gear train according to an embodiment of the present invention.

In FIG. 2, reference numeral 70 denotes a sub speed change gear unit which receives the rotational motive power from a main speed change gear (not shown) and selectively sets the operating mode to the high-speed or low-speed operating mode. Numeral 72 denotes a transfer unit to selectively set the driving operation to the 2WD or 4WD mode.

A main drive shaft 76 which receives the rotational motive power from the main speed change gear is supported by a ball bearing 78 and rotatably arranged in a casing 74 of the sub speed change gear unit 70. Subsequent to the main drive shaft 76, a main shaft 82 is coaxially and relatively rotatably arranged in the casing 74 through a needle bearing 80. The main shaft 82 penetrates inside of a casing 84 of the transfer unit 72 and is rotatably supported by a ball bearing 86 and is taken out to the outside. The rotational motive power is transferred to the rear wheels through a propeller shaft (not shown) by the main shaft 82.

A main drive gear 90 is relatively rotatably attached to the main drive shaft 76 through a needle bearing 88. A first counter gear 92 fixed to a counter shaft 94 is come into engagement with the main drive gear 90. The counter shaft 94 is supported by ball bearings 98 and 100. A second counter gear 96 is further fixed to the main drive gear 90.

The main drive gear 90 is integrally formed with a first clutch gear 102. A first hub 104 which is fixed to or integrally formed with the axial end of the main drive shaft 76 is arranged on the right side of the first clutch gear 102. Further, a second clutch gear 106 fixed to the main shaft 82 is arranged on the right side of the first hub 104. A first coupling sleeve 108 is come into engagement with the outsides of the first clutch gear 102, first hub 104, and second clutch gear 106 so as to be slidable in the axial direction.

At the high-speed position, the first coupling sleeve 108 is set to the engagement position adapted to couple the first hub 104 with the second clutch gear 106 as shown in the diagram. At the low-speed position, the coupling sleeve 108 is moved to the left and set to the engagement position adapted to couple the first hub 104 with the first clutch gear 102.

The first clutch gear 102, first hub 104, second clutch gear 106, and first coupling sleeve 108 constitute the first switching means for setting the operating mode to the high-speed or low-speed operating mode.

The second counter gear 96 fixed to the counter shaft 94 is come into engagement with a speed change gear 112 which is rotatably attached to the main shaft 82 by a needle bearing 110. A third clutch gear 114 is fixed to or integrally formed with the speed change gear 112. A fourth clutch gear 116 fixed to the main shaft 82 is arranged on the right side of the third clutch gear 114. Further, a second hub 118 is arranged on the right side of the fourth clutch gear 116. The second hub 118 is fixed to or integrally formed with a first sprocket gear 120 serving as a front drive gear. The first sprocket gear 120 is rotatably attached to the main shaft 82 by a needle bearing 122.

A second coupling sleeve 124 is come into engagement with the outsides of the third clutch gear 114, fourth clutch gear 116, and second hub 118 and is attached to them so as to be movable in the axial direction.

In the 2WD high-speed operating mode, the second coupling sleeve 124 is moved to the right and is come into engagement with only the second hub 118. On the other hand, in the 4WD high-speed operating mode, the fourth clutch gear 116 is come into engagement with and coupled with the second hub 118 as shown in the diagram. Further, in the 4WD low-speed operating mode, all of the third clutch gear 114, fourth clutch gear 116, and second hub 118 are come into engagement and coupled with each other. Moreover, in the 2WD low-speed operating mode, the third clutch gear 114 is come into engagement with and coupled with the fourth clutch gear 116. The second switching means for setting the driving mode to the 2WD or 4WD is constituted by the third clutch gear 114, fourth clutch gear 116, second hub 118, and second coupling sleeve 124.

The first sprocket gear 120 is coupled with a second sprocket gear 130 fixed to a front drive shaft 128 by a chain 126. The first sprocket gear 120 is driven only in the case of the 4WD running mode, thereby driving the second sprocket gear 130 fixed to the front drive shaft 128 through the chain 126.

The operation will now be described.

The operation at the 2WD high-speed position (2WD-H) will be first explained.

When the shift lever is set to the 2WD-H, the first coupling sleeve 108 in the sub speed change gear unit 70 is moved to the right and come into engagement with the second clutch gear 106 as shown in the diagram. The first hub 104 is come into engagement with and coupled with the second clutch gear 106. At this time, the coupling sleeve 124 of the transfer unit 72 is come into engagement with only the second hub 118.

Therefore, the rotational motive power from the main drive shaft 76 is transferred to the main shaft 82 through the first hub 104, first coupling sleeve 108, and second clutch gear 106 due to the engagement and coupling between the first hub 104 and the second clutch gear 106 by the first coupling sleeve 108. The gear mechanism is not interposed in this motive power transfer system. Therefore, the rotational motive power of the main drive shaft 76 is directly coupled with the main shaft 82.

At this time, since the second coupling sleeve 124 of the transfer unit 72 is moved to the right and come into engagement with only the second hub 118, the first sprocket gear 120 disengages from the main shaft 82. The rotational motive power is not transferred to the front drive shaft 128. The rear wheels are driven by only the main shaft 82 and the automobile enters the 2WD-H running state.

In the 2WD-H mode, the main drive gear 90, first counter gear 92, counter shaft 94, second counter gear 96, and speed change gear 112 do not rotate and the racing of the speed reduction gear system does not occur. Therefore, the noises by the racing of the gears are not generated. The loss of motive power due to the racing of the speed reduction gear system is not caused.

The operation at the 4WD high-speed position (4WD-H) will now be described.

When the shift lever is set to the 4WD-H, the first coupling sleeve 108 of the sub speed change gear unit 70 is come into engagement with and coupled with the first hub 104 and second clutch gear 106 as shown in the diagram similarly to the case of the 2WD-H.

On the other hand, in the 4WD-H mode, the second coupling sleeve 124 in the transfer unit 72 is moved to the left and come into engagement with the fourth clutch gear 116, thereby engaging and coupling the second hub 118 with the fourth clutch gear 116. Therefore, the rotational motive power of the main shaft 82 is transferred to the first sprocket gear 120 through the fourth clutch gear 116, second coupling sleeve 124, and second hub 118. Further, this power is transferred to the front drive shaft 128 through the chain 126 and second sprocket gear 130, thereby driving the front wheels. Thus, the automobile enters the 4WD-H running state.

Even in such a 4WD-H mode, the speed reduction gear system consisting of the main drive gear 90, first counter gear 92, counter shaft 94, second counter gear 96 and speed change gear 112 does not rotate. The noises due to the racing of the gears are not generated. In addition, the loss of motive power due to the racing of the gears can be restricted.

The operation in the 4WD low-speed position (4WD-L) will now be explained.

When the shift lever is set to the 4WD-L mode, the first coupling sleeve 108 in the sub speed change gear unit 70 is moved to the left and come into engagement with the first clutch gear 102, thereby engaging and coupling the first hub 104 with the first clutch gear 102. Thus, the rotational motive power of the main drive shaft 76 is transferred to the main drive gear 90 through the first hub 104 and first clutch gear 102. Further, this power is transferred through the first counter gear 92, counter shaft 94, and second counter gear 96 and the speed is reduced. The speed reduced rotational motive power is transferred to the speed change gear 112.

At this time, the second coupling sleeve 124 in the transfer unit 72 is moved to the engaging position with all of the third clutch gear 114, fourth clutch gear 116, and second hub 118. The rotational motive power of the speed change gear 112 is transferred to the main shaft 82 and also to the first sprocket gear 120. Thus, the speed reduced rotational motive power from the speed change gear 112 is transferred from the main shaft 82 to the rear wheels and at the same time, it is also transferred from the front drive shaft 128 to the front wheels. Therefore, the automobile enters the 4WD-L running state.

Further, when the shift lever is set to the 2WD low-speed position (2WD-L), the first coupling sleeve 108 of the sub speed change gear unit 70 couples the main drive shaft 76 with the counter drive gear 90 by the first switching means similarly to the case of the 4WD-L mode, so that the speed reduced rotational motive power is transferred to the speed change gear 112. On the other hand, the second coupling sleeve 124 in the transfer unit 72 is moved to the position at which the fourth clutch gear 116 is come into engagement with and coupled with the third clutch gear 114. Accordingly, the speed reduced rotational motive power of the speed change gear 112 is transferred to the main shaft 82 and to only the rear wheels. Thus, the automobile enters the 2WD-L running state.

The foregoing switching operations in the embodiment of FIG. 2 will be summarized as shown in Table 1.

In Table 1, $C_1$ denotes the first clutch gear 102; $C_2$ indicates the second clutch gear 106; $C_3$ the third clutch gear 114; $C_4$ the fourth clutch gear 116; $H_1$ the first hub 104; and $H_2$ the second hub 118.

TABLE 1

| Switching means | Position | | | |
|---|---|---|---|---|
| | 2H | 2L | 4H | 4L |
| First switching means | $H_1 + C_2$ | $C_1 + H_1$ | $H_1 + C_2$ | $C_1 + H_1$ |
| Second switching means | Only $H_2$ | $C_3 + C_4$ | $C_4 + H_2$ | $C_3 + C_4 + H_2$ |

Figure 3:
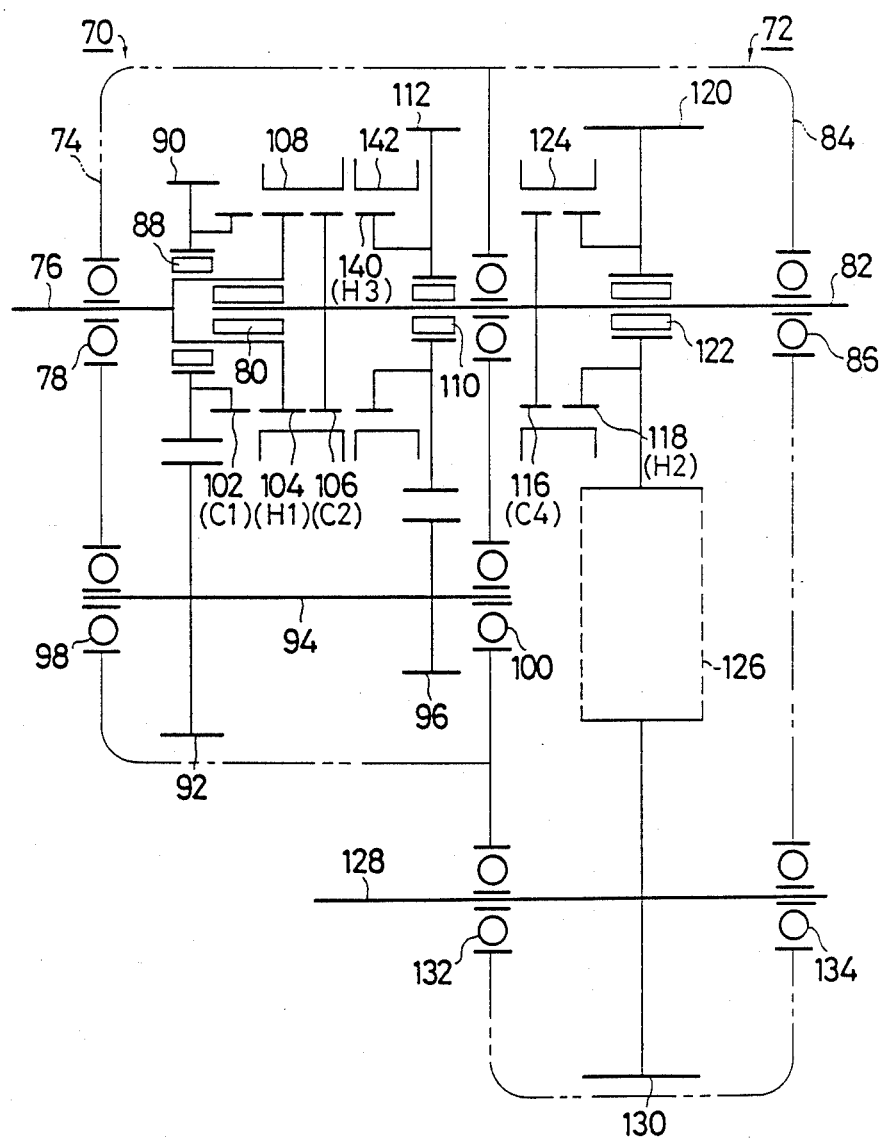
FIG. 3 is a diagram showing an arrangement of a gear train according to another embodiment of the invention.

FIG. 3 is a diagram showing an arrangement of a gear train according to another embodiment of the invention.

In the embodiment of FIG. 3, a third hub 140 which is integrally formed with the speed change gear 112 is newly arranged on the right side of the second clutch gear in the sub speed change gear unit 70 shown in the embodiment of FIG. 2 and, further, the third hub 140 and second clutch gear 106 are switched by a third coupling sleeve 142.

The third switching means is constituted by the second clutch gear 106, third hub 140, and third coupling sleeve 142.

In the third switching means, the third coupling sleeve 142 is come into engagement with only the third hub 140 in the 2WD-H and 4WD-H modes. The sleeve 142 is come into engagement with the second clutch gear 106 in the 2WD-L and 4WD-L, thereby engaging and coupling the second clutch gear 106 with the third hub 140.

Further, in the embodiment of FIG. 3, the third clutch gear 114 provided in the transfer unit 72 in the embodiment of FIG. 2 is removed and the second switching means is constituted by the fourth clutch gear 116, second hub 118, and second coupling sleeve 124.

The second coupling sleeve 124 provided for the second switching means is come into engagement with only the second hub 118 in the 2WD-H and 2WD-L modes. On the other hand, in the 4WD-H and 4WD-L modes, the sleeve 124 is come into engagement with the second hub 118 and fourth clutch 116 and couples them.

The other constitution and operation are the same as those in the embodiment of FIG. 2. Therefore, the switching operations of the embodiment of FIG. 3 will be summarized as shown in Table 2.

In Table 2, $H_3$ denotes the third hub 140.

TABLE 2

| Switching means | Position | | | |
|---|---|---|---|---|
| | 2H | 2L | 4H | 4L |
| First switching means | $H_1 + C_2$ | $C_1 + H_1$ | $H_1 + C_2$ | $C_1 + H_1$ |
| Second switching means | Only $H_2$ | Only $H_2$ | $C_4 + H_2$ | $C_4 + H_2$ |
| Third switching means | Only $H_3$ | $C_2 + H_3$ | Only $H_3$ | $C_2 + H_3$ |

In the embodiment of FIG. 3, in the 2WD-H and 4WD-H running modes, the main drive gear 90, first counter gear 92, counter shaft 94, second counter gear 96, and speed change gear 112 do not rotate and the racing of the speed reduction gear system does not occur. Thus, the noises due to the racing of the gears are not generated and the unnecessary rotation of the speed reduction gear system is prevented. Therefore, the loss of motive power of the driving system can be minimized.

It is desirable to provide the synchronizing mechanism for the coupling sleeves 108, 124, and 142 shown in the embodiments of FIGS. 2 and 3 in order to enable the operating mode to be switched during the running, respectively.

Although the foregoing embodiments have been described with respect to the example of the transfer unit to transfer the rotational motive power to the side of the front wheels by the chain, the rotational motive power may be also transferred to the front wheel side by the gear train.

What is claimed is:

1. A transfer system for use in automobiles in which a rotational motive power from a main speed change gear is received and the rotational speed is changed to at least two high and low speeds and also the driving mode is switched between the two-wheeled driving and four-wheeled driving modes, comprising:

a main drive shaft to which the rotational motive power is input from said main speed change gear;

a main shaft which is coaxially and relatively rotatably arranged with said main drive shaft and transfers the rotational motive power to rear wheels;

a main drive gear rotatably supported on said main drive shaft;

a speed change gear rotatably supported on said main shaft;

a counter gear mechanism for reducing the rotational speed of the rotational motive power of the main drive gear and transferring to said speed change gear;

first switching means for coupling the main drive shaft with the main shaft in the two-wheeled driving or four-wheel driving mode at the high-speed position, and for coupling the main drive shaft with the main drive gear in the two-wheeled driving or four- wheel driving mode at the low-speed position;

a front drive gear which is rotatably supported to the main shaft and transfers the rotational motive power to front wheels; and second switching means for disconnecting the speed change gear and the front drive gear from the main shaft in the two-wheeled driving mode at the high-speed position, for coupling the main shaft with the front drive gear in the four-wheeled driving mode at the high-speed position, for coupling all of the speed change gear, the main shaft, and the front drive gear in the four-wheeled driving mode at the low-speed position, and for coupling the speed change gear with the main shaft in the two-wheeled driving mode at the low-speed position.

2. A transfer system according to claim 1, wherein said first switching means comprises:

a first clutch gear which is fixed to or integrally formed with said main drive gear;

a first hub fixed to the main drive shaft;

a second clutch gear fixed to said main shaft; and a first coupling sleeve for engaging and coupling said first hub with said second clutch gear in the two-wheeled driving or four-wheeled driving mode at the high-speed position, and for engaging and coupling the first hub with said first clutch gear in the two-wheeled driving or four-wheeled driving mode at the low-speed position.

3. A transfer system according to claim 1, wherein said second switching means comprises:

a third clutch gear fixed to or integrally formed with said speed change gear;

a fourth clutch gear fixed to said main shaft;

a second hub integrally formed with said front drive gear; and second coupling sleeve for coming into engagement with only said second hub in the two-wheeled driving mode at the high-speed position, for engaging and coupling the second hub with said fourth clutch gear in the four-wheeled driving mode at the high-speed position, for coupling all of the third clutch gear, the second hub, and the fourth clutch gear in the four-wheeled driving mode at the low-speed position, and for engaging and coupling the third clutch gear with the fourth clutch gear in the two-wheeled driving mode at the low-speed position.

4. A transfer system according to claim 1, wherein said front drive gear consists of a sprocket gear and transfers the rotational motive power to another sprocket gear fixed to the front drive shaft through a chain.

5. A transfer system for use in automobiles in which a rotational motive power from a main speed change gear is received and the rotational speed is changed to at least two high and low speeds and also the driving mode is switched between the two-wheeled driving and four-wheeled driving modes, comprising:

a main drive shaft to which the rotational motive power is input from said main speed change gear;

a main shaft which is coaxially and relatively rotatably arranged with said main drive shaft and transfers the rotational motive power to rear wheels;

a main drive gear rotatably supported on said main drive shaft;

a speed change gear rotatably supported on said main shaft;

a counter gear mechanism for reducing the rotational speed of the rotational motive power of the main drive gear and transferring to said speed change gear;

first switching means for coupling the main drive shaft with the main shaft in the two-wheeled driving, or four-wheeled driving at the high-speed position, and for coupling the main drive shaft with the main drive gear in the two-wheeled driving or four-wheeled driving mode at the low-speed position;

a front drive gear which is rotatably supported to the main shaft and transfers the rotational motive power to front wheels;

second switching means for disconnecting the main shaft from the front drive gear in the two-wheeled driving mode at the high-speed or low-speed position, and for coupling the main shaft with the front drive gear in the four-wheeled driving mode at the high-speed or low-speed position; and third switching means for disconnecting the main shaft from the speed change gear in the two-wheeled driving or 4WD mode at the high-speed position, and for coupling the speed change gear with the main shaft in the two-wheeled driving or four-wheeled driving mode at the low-speed position.

6. A transfer system according to claim 5, wherein said first switching means comprises:

a first clutch gear which is fixed to or integrally formed with said main drive gear;

a first hub which is fixed to or integrally formed with said main drive shaft;

a second clutch gear fixed to said main shaft; and a first coupling sleeve for engaging and coupling said first hub with said second clutch gear in the two-wheeled driving or four-wheeled driving mode at the high-speed position, and for engaging and coupling the first hub with said first clutch gear in the two-wheeled driving or four-wheeled driving mode at the low-speed position.

7. A transfer system according to claim 5, wherein said second switching means comprises:

a fourth clutch gear fixed to said main shaft;

a second hub which is fixed to or integrally formed with said front drive gear; and a second coupling sleeve for coming into engagement with either said fourth clutch gear or said second hub in the two-wheeled driving mode at the high-speed or low speed position, and for engaging and coupling the second hub with said fourth clutch gear in the four-wheeled driving mode at the high-speed or low-speed position.

8. A transfer system according to claim 5, wherein said third switching means comprises:

a second clutch gear fixed to said main shaft;

a third hub which is fixed to or integrally formed with said speed change gear; and a third coupling sleeve for coming into engagement with only said third hub in the two-wheeled driving or four-wheeled driving mode at the high-speed position, and for engaging and coupling said second clutch gear with the third hub in the two-wheeled driving or four-wheeled driving mode at the low-speed position.

* * * * *